United States Patent [19]

Nagae et al.

[11] Patent Number: 4,759,419
[45] Date of Patent: Jul. 26, 1988

[54] VEHICLE SPEED RESPONSIVE POWER STEERING ASSEMBLY

[75] Inventors: Kiyoshi Nagae; Yoshiaki Hattori, both of Aichi, Japan

[73] Assignee: Tokai TRW & Co., Ltd, Kasugai, Japan

[21] Appl. No.: 919,854

[22] Filed: Oct. 16, 1986

[30] Foreign Application Priority Data

Oct. 18, 1985 [JP] Japan ................................ 60-232392

[51] Int. Cl.⁴ ............................................. B62D 5/08
[52] U.S. Cl. ................................... 180/142; 180/141; 74/388 PS; 91/372
[58] Field of Search ................... 180/141, 142, 143; 74/388 PS; 91/372, 371, 373

[56] References Cited

U.S. PATENT DOCUMENTS

| 4,002,220 | 1/1977 | Wible | 180/141 |
| 4,345,661 | 8/1982 | Nishikawa | 180/141 |
| 4,601,358 | 7/1986 | Kozuka et al. | 180/143 |
| 4,640,380 | 2/1987 | Daido et al. | 180/141 |
| 4,644,846 | 2/1987 | Kozuka | 180/142 |

Primary Examiner—John J. Love
Assistant Examiner—Donn McGiehan
Attorney, Agent, or Firm—Tarolli, Sundheim & Covell

[57] ABSTRACT

A power assist steering assembly for a vehicle comprises a power assist actuator, a pump for supplying pressurized fluid to the power assist actuator, and a steering control valve comprising a movable valve member for controlling flow of pressurized fluid to the power assist actuator. A conduit that communicates pressurized fluid from the pump to the steering control valve comprises a restriction orifice. A conduit device controls the flow of pressurized fluid through the restriction orifice in accordance with vehicle speed. A mechanism is provided to resist movement of the valve to increase flow of pressurized fluid to the power assist actuator with a force which increases as vehicle speed increases. The mechanism comprises a first fluid chamber, a spring located in the first fluid chamber for biasing the valve member to a neutral position thereof, and a second fluid chamber the pressure in which counteracts the action of the spring. First and second conduits communicate the first and second fluid chambers with the downstream and upstream sides of the restriction orifice, respectively.

2 Claims, 7 Drawing Sheets

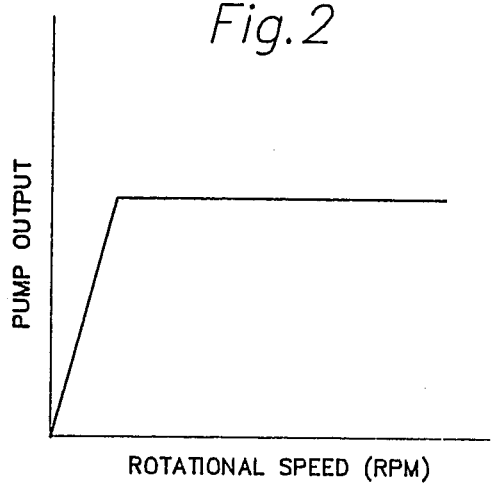
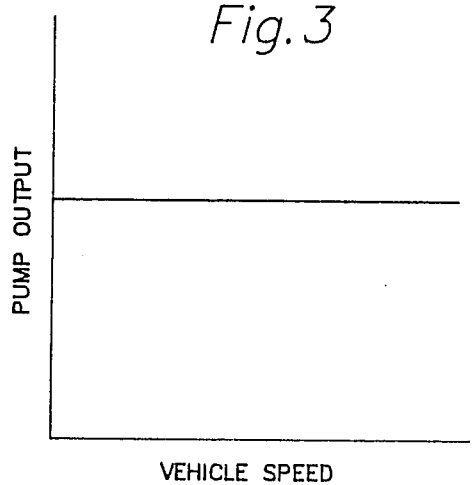

VEHICLE SPEED RESPONSIVE POWER STEERING ASSEMBLY

BACKGROUND OF THE INVENTION

The present invention relates to a vehicle speed responsive power steering assembly and particularly to a power steering assembly in which the amount of power assist is varied in accordance with vehicle speed.

Vehicle speed responsive power steering assemblies in which the amount of power assist is varied by varying the displacement of a valve member of a control valve which controls the flow of pressurized oil to fluid chambers of a power steering actuator, are known. One of such assemblies is shown in FIG. 12. The assembly shown in FIG. 12 comprises a power steering pump 1 and a control valve 3 that controls oil flow to a power assist actuator 4. A conduit communicating the pump 1 with the control valve 3 has a restriction orifice 2 therein. Return oil from the actuator 4 passes through the control valve 3 back to a reservoir 5. The control valve 3 includes a restricting mechanism 7 including a piston 6. The pressurized oil from the pump 1 also passes through a changeover valve 8 to a fluid chamber of the restricting mechanism 7 and through a orifice 9 to the inlet of a vehicle speed responsive pump 10. The outlet of the pump 10 is connected to the reservoir 5. The upstream side of the orifice 2 is connected through the changeover valve 8 with the fluid chamber of the restricting mechanism 7 and the orifice 9. The changeover valve 8 is controlled by a pressure generated by the pump 10 which rotates at vehicle speed. When the vehicle speed increases, the changeover valve 8 operates to communicate the oil pressure upstream of the orifice 2 to the fluid chamber of the restricting mechanism 7 which moves the valve body of the valve 3 to a neutral position of the valve 3.

Another known vehicle speed responsive power steering assembly is shown in FIG. 13. The assembly shown in FIG. 13 also comprises a power steering pump 1, a restriction orifice 2, a control valve 3, a power assist actuator 4, a pump reservoir 5, a restricting mechanism 7 including a piston 6, and a changeover valve 8 which are essentially similar to those shown in the assembly of FIG. 12. As shown in FIG. 13, a flow-rate control valve 12 is connected through a pressure control valve 11 with the pump 1. The pressure control valve 11 is connected with the outlet of the flow-rate control valve 12 and the restricting mechanism 7. Solenoid 13 of the flow rate control valve 12 is connected with a control device 14 to which a signal from a vehicle speed sensor 14' is applied.

In the assembly of FIG. 13, a vehicle speed signal from the vehicle speed detector 14' is applied to the control device 14 which generates a signal applied to the solenoid 13 of the flow-rate control valve 12 which controls oil flow through the changeover valve 8 and pressure control valve 11 which communicates oil pressure upstream of the orifice 2 to the fluid chamber of the restricting mechanism 7.

The known assemblies shown in FIGS. 12 and 13 have complex structure, necessitate high accuracy, and are expensive to manufacture. Especially, the device of FIG. 13 includes a plurality of control and changeover valves so that the reliability of the assembly decreases. Because restriction of oil pressure is required, while running, to increase primary fluid energy of the power pump, a cooling mechanism is necessary to prevent the operating oil from overheating.

SUMMARY OF THE INVENTION

The object of the invention is a vehicle speed responsive power steering assembly which is relatively simple and reliable. The vehicle speed responsive power steering assembly according to the present invention comprises flow rate control means connected with a control valve which controls the flow of pressurized oil to fluid chambers of a power steering actuator in accordance with a steering torque and a restricting mechanism that comprises spring means for biasing a valve body of the control valve to a neutral position thereof. The conduit that connects the flow rate control means with the control valve comprises an orifice the flow through which is reduced upon increase in the vehicle speed. The upstream side of the orifice is connected with a fluid chamber the pressure in which acts in opposition to the spring force of the spring means, and the downstream side of the orifice is connected with a fluid chamber in which the spring means is located.

According to the present invention, when the vehicle speed is very low or zero, the oil flow to the control valve is at its maximum, and the pressure difference across the orifice is also at the maximum so that the spring force acting on the valve body is offset. The valve member moves to its maximum working position, and the amount of power assist is also at its maximum. When the vehicle speed increases, oil flow is decreased so that the pressure differences across the orifice is also decreased. This leads to a decrease in the offset force acting on the valve body. The spring means moves the valve body to its neutral position, and the power assist decreases.

BRIEF DESCRIPTION OF THE DRAWINGS

FIGS. 2 to 9 are graphs showing operating characteristics of the assembly of FIG. 1;

DETAILED DESCRIPTION OF THE PREFERRED EMBODIMENTS

Figure 1:
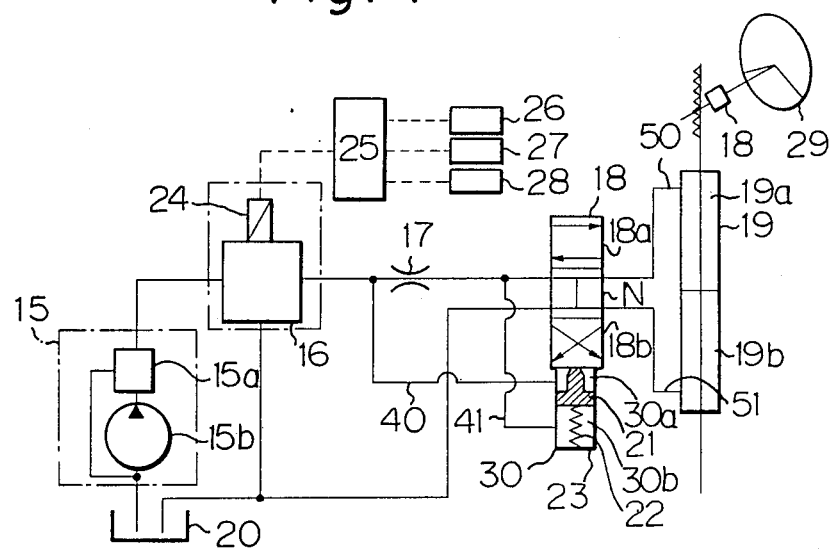
FIG. 1 is a block diagram of a vehicle speed responsive power steering assembly according to a first embodiment of the present invention.

A first embodiment of vehicle speed responsive power steering assembly according to the present invention is shown in FIG. 1. The assembly comprises an engine driven pump unit 15 consisting of a control section 15a and a pump 15b. A flow rate control section 16 controls flow of pressurized fluid to a control valve 18 which controls fluid flow to a power assist actuator 19. The conduit that connects the flow control section 16 with the control valve 18 has a restriction orifice 17 therein. The control valve is schematically shown in FIG. 1 and is of a conventional type. The control valve has a neutral position N, a parallel port position 18a and a cross port position 18b. The actuator 19 has chambers 19a and 19b. Conduits 50 and 51 connect the control valve to chambers 19a and 19b, respectively. Return oil from the actuator 19 passes through the control valve 18 to a pump reservoir 20. The upstream and downstream side of the restriction orifice 17 are connected to a restricting mechanism 23.

The restricting mechanism 23 includes a housing 30 having two chambers 30a and 30b. A spring 22 that biases the valve body of the control valve 18 to a neutral position of the valve, is located in the chamber 30b. Conduit 40 connects the upstream side of orifice 17 to the fluid chamber 30a. Conduit 41 connects the downstream side of the orifice 17 to the spring chamber 30b. A piston 21 defines the two chambers 30a and 30b in the housing 30.

The flow rate control section 16 is adapted to bypass the pump output to the pump reservoir 20. A solenoid 24 of the flow rate control section 16 is connected with a control device 25 which controls the position of solenoid 24 in accordance with signals from a vehicle speed sensor 26, a steering angular velocity sensor 27 and a mode selector 28. The control valve 18 is connected with a steering shaft of a steering wheel 29.

Figure 4:
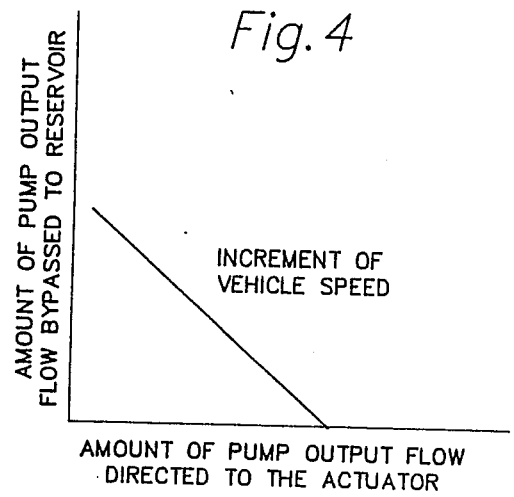

In operation, the engine driven pump unit 15 discharges a constant amount of pressurized oil at an engine speed that exceeds the idling rotational speed of the engine. The relation between the rotational speed of the engine and the output of the pump unit 15 is shown in FIG. 2. The regulated output of the pump unit 15 is set to correspond to a steering torque required to steer the vehicle in stopped position at idling rotational speed of the engine. When the vehicle is running, the engine rotational speed exceeds the idling speed and the relation between the rotational vehicle speed and the output of the pump unit 15 is constant as shown in FIG. 3. The flow rate control section 16 communicates the pressurized oil from the pump unit 15 to the control valve 18 and the pump reservoir 20 in accordance with the vehicle speed. The ratio of amounts of pressurized oil communicated to the control valve and the reservoir is controlled in a pressure compensating manner. This ratio is determined by the solenoid 24. The solenoid 24 is electrically controlled by the control circuit 25 in accordance with input signals from the vehicle speed sensor 26, steering angular velocity sensor 27, and the mode selector 28 which selects the amount of power assist as desired. The ratio of flow of pressurized oil to the control valve and flow of the pressurized fluid to the reservoir in relation to the vehicle speed is shown in FIG. 4.

Figure 5:
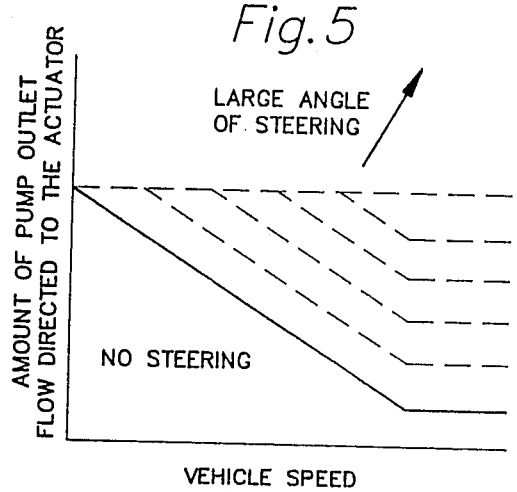

FIG. 5 shows the relation between the vehicle speed and the amount of oil supplied to the control valve 18. As the steering angular velocity increases, the flow rate control section 16 is regulated accordingly to increase oil flow to the actuator 19.

Figure 6:
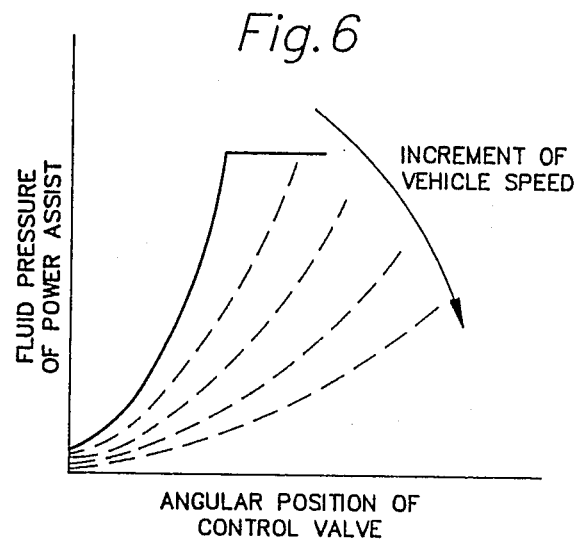
Figure 7:
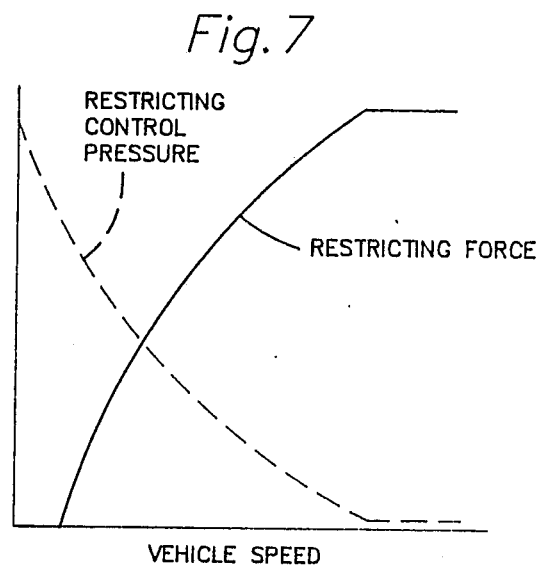
Figure 8:
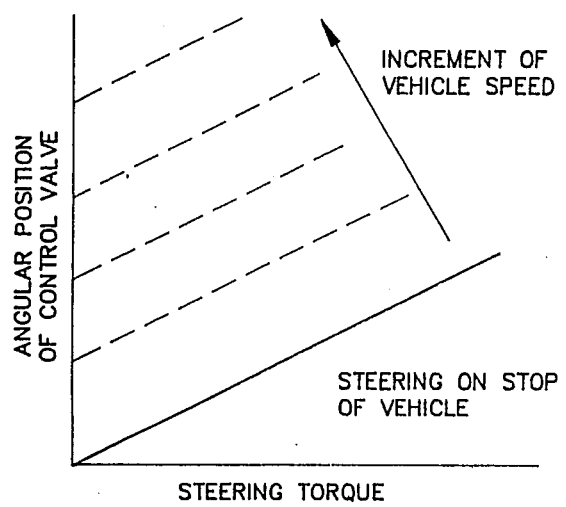
Figure 9:
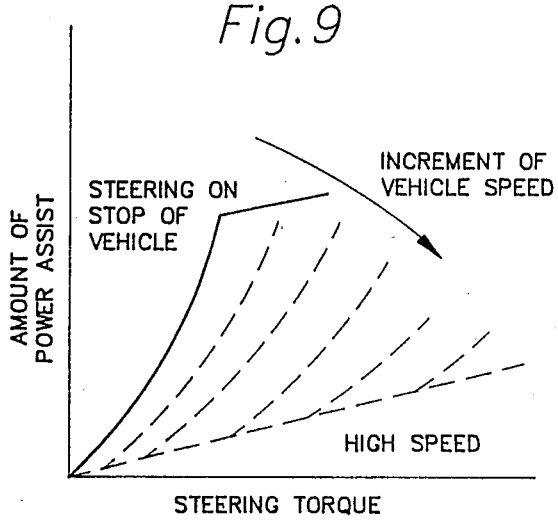
Figure 10:
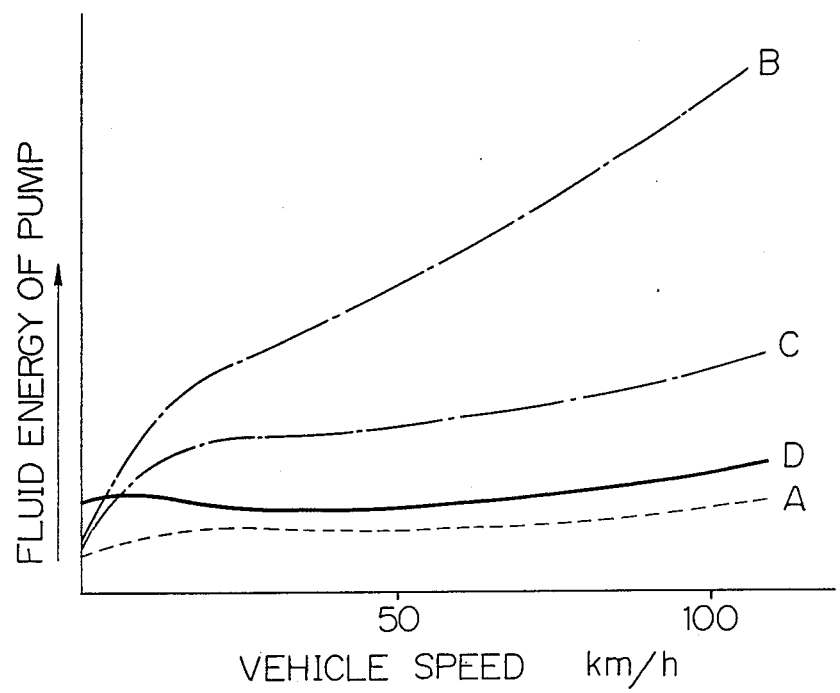
FIG. 10 is a graph comparing pump fluid energy of different power steering assemblies.
Figure 12:
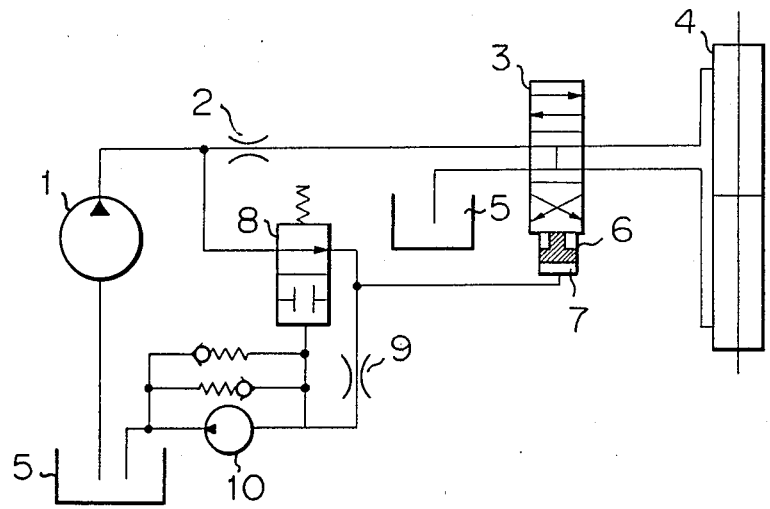
FIGS. 12 and 13 are block diagrams of prior art vehicle speed responsive power steering assemblies.
Figure 13:
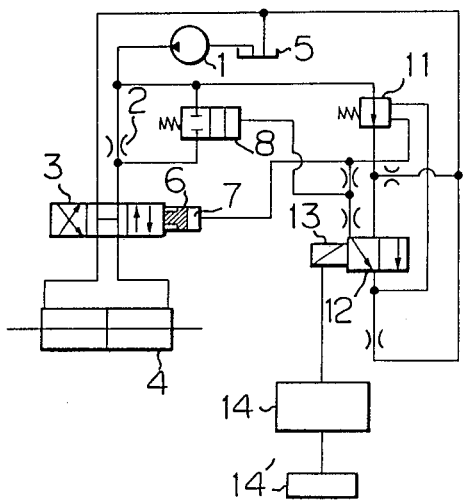

The relation between the relative position of the valve body of the control valve 18 and the oil pressure communicated to the actuator as a function of a vehicle speed is shown in FIG. 6. As described, the orifice 17 is located in the oil conduit extending between the flow rate section 16 and the control valve 18. The pressure upstream of the orifice 17 is communicated to the fluid chamber of the restricting mechanism 23 which counteracts the spring force and the pressure downstream of the orifice is communicated to the spring fluid chamber. The restricting mechanism 23 is constructed such that the piston 21 holds the valve body of the control valve 18 in the neutral position by being acted upon by the spring 22. The restriction force that urges the valve body to the neutral position is small when the pressure difference across the orifice 17 is large. The relation between the pressure differences and the restricting force as a function of a vehicle speed is shown in FIG. 7. FIG. 8 shows the relation between a steering torque and the angular position of the valve body of the control valve 18. The relation between a steering torque and a power steering output as a function of a vehicle speed is shown in FIG. 9. As shown, superior steering feel can be obtained. FIG. 10 shows the relation between the vehicle speed and pump fluid energy. Curve A characterizes a typical power steering device without a restricting mechanism, curve B characterizes the device shown in FIG. 13, curve C characterizes the device shown in FIG. 12, and curve D characterizes the device of the present invention. As shown, pump energy requirements are small especially at high speeds.

Figure 11:
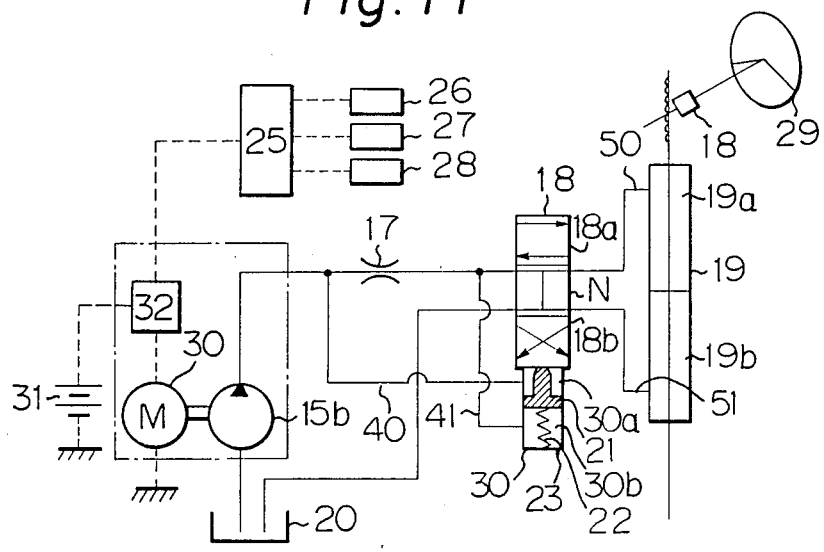
FIG. 11 is a block diagram of a vehicle speed responsive power steering assembly according to a second embodiment of the present invention.

FIG. 11 shows a block diagram of a vehicle speed responsive power steering assembly, according to a second embodiment of the present invention. The pump unit 15, restriction orifice 17, control valve 18, actuator 19, pump reservoir 20, and the restriction mechanism 23 with a piston 21 are similar to those of the first embodiment. In FIG. 11, a pump 15b is driven by a motor 30 which is controlled by a drive control section 32. The control section 32 controls electric power supply from a vehicle electric source 31 to the motor to drive the pump with a rotational speed corresponding to vehicle speed. The drive control section 32 is controlled by a control circuit 25 which is connected with the vehicle speed sensor 26, steering angular velocity sensor 27, and the mode selector 28.

The operation of the assembly shown in FIG. 11 is essentially similar to that of the first embodiment.

It will be appreciated that the present invention advantageously provides a relatively cheap, reliable and effective power steering assembly.

In the assembly according to the invention, a restricting force acting on the valve body of the control valve, which controls flow of pressurized oil to the power assist actuator, is provided by a spring element. The restricting force decreases as the offsetting fluid pressure increases, so that the amount of power assist increases vehicle speed decreases. When the vehicle speed increases, power assist decreases and the rotational speed of the pump is high, the offsetting oil pressure is low and the pump discharge oil pressure is low. Therefore, the pump energy consumption while at high speeds is low, and the pressurized oil is not overheated. As the vehicle speed increases, oil flow to the power assist actuator through the orifice decreases. As a result, the pressure differential across the orifice is reduced. This results in a decrease in the oil pressure that offsets the spring force, and the spring element causes movement of the valve body to a neutral position thereof.

We claim:

1. A power assist steering assembly for vehicle comprising:
   a power assist actuator for providing power assist;
   a pump for supplying pressurized fluid to said power assist actuator;
   a steering control valve for controlling flow of pressurized fluid to said power assist actuator, said steering control valve comprising a valve member manually movable away from a neutral position to increase the flow of pressurized fluid to said power assist actuator in accordance with steering torque;
   conduit means for communicating the flow of pressurized fluid from said pump to said steering control valve;

a restriction orifice located in said conduit means;
control means for controlling the flow of pressurized fluid through said restriction orifice in accordance with vehicle speed; and
means for resisting movement of said valve member to increase flow of pressurized fluid to said power assist actuator with a force which increases as vehicle speed increases, said resisting means comprising a first fluid chamber, a spring located in said first fluid chamber for biasing said valve member to the neutral position thereof, a second fluid chamber the pressure in which counteracts the action of said spring, and first and second conduits for communicating said first and second fluid chambers with the downstream and upstream sides of said restriction orifice, respectively.

2. A power assist steering assembly as set forth in claim 1 wherein said resisting means comprises a housing located adjacent said valve member and a piston member located in said housing and defining said first and second fluid chambers, said spring acting on said piston member to urge said piston member to move said valve member toward the neutral position thereof.

* * * * *